(12) United States Patent
Ishii et al.

(10) Patent No.: US 11,413,798 B2
(45) Date of Patent: Aug. 16, 2022

(54) VEHICLE INTERIOR BOARD AND METHOD FOR MANUFACTURING SAME

(71) Applicant: MORIDEN Co., Ltd., Tokyo (JP)

(72) Inventors: Junichi Ishii, Gunma (JP); Masahiro Kondou, Gunma (JP); Takumi Ono, Gunma (JP); Yoshihisa Tokutomi, Gunma (JP)

(73) Assignee: MORIDEN Co., Ltd., Tokyo (JP)

( * ) Notice: Subject to any disclaimer, the term of this patent is extended or adjusted under 35 U.S.C. 154(b) by 0 days.

(21) Appl. No.: 16/346,139

(22) PCT Filed: Aug. 3, 2017

(86) PCT No.: PCT/JP2017/028185
§ 371 (c)(1),
(2) Date: Apr. 30, 2019

(87) PCT Pub. No.: WO2019/026224
PCT Pub. Date: Feb. 7, 2019

(65) Prior Publication Data
US 2020/0147841 A1 May 14, 2020

(51) Int. Cl.
*B29C 44/16* (2006.01)
*B32B 3/30* (2006.01)
(Continued)

(52) U.S. Cl.
CPC .............. *B29C 44/16* (2013.01); *B29C 44/38* (2013.01); *B32B 3/30* (2013.01); *B32B 15/046* (2013.01);
(Continued)

(58) Field of Classification Search
CPC ..... B29C 44/16; B29C 44/38; B29C 44/1228; B32B 3/30; B32B 15/046;
(Continued)

(56) References Cited

U.S. PATENT DOCUMENTS

| 5,646,400 A | * | 7/1997 | Perez | G01N 21/774 250/226 |
| 2006/0029751 A1 | * | 2/2006 | Cowelchuk | B60R 13/02 428/31 |

(Continued)

FOREIGN PATENT DOCUMENTS

| JP | 62-83142 A | 4/1987 |
| JP | 2002-144477 A | 5/2002 |

(Continued)

OTHER PUBLICATIONS

Konishi et al., JP2009090522A—English Translation, Apr. 30, 2009, JPO, pp. 1-32 (Year: 2009).*

(Continued)

*Primary Examiner* — Philip C Tucker
*Assistant Examiner* — Jimmy R Smith, Jr.
(74) *Attorney, Agent, or Firm* — Troutman Pepper Hamilton Sanders LLP

(57) ABSTRACT

A vehicle interior board which is thin, lightweight, has high strength, has less degradation, peeling and the like near an end portion of a metal plate, and has high quality and excellent productivity; and a method for manufacturing the same. The vehicle interior board includes a pair of metal plates and a foamed polyurethane layer formed between the pair of metal plates. A projecting ridge projecting outwardly and extending in a predetermined direction along the outer surface is formed on an outer surface of the metal plate. Thus, it is possible to obtain desired strength and rigidity even when the metal plates or the foamed polyurethane layer are thinned or when a lightweight aluminum plate or the like is adopted as the metal plates. Therefore, it is possible to reduce weight of a vehicle interior board.

3 Claims, 5 Drawing Sheets

(51) Int. Cl.
  *B32B 15/04* (2006.01)
  *B62D 29/00* (2006.01)
  *B29C 44/38* (2006.01)
  *B29K 75/00* (2006.01)
  *B29K 705/00* (2006.01)
  *B29L 31/30* (2006.01)
  *B62D 25/20* (2006.01)

(52) U.S. Cl.
  CPC ........ *B62D 29/002* (2013.01); *B29K 2075/00* (2013.01); *B29K 2705/00* (2013.01); *B29L 2031/3005* (2013.01); *B32B 2266/0278* (2013.01); *B32B 2605/003* (2013.01); *B62D 25/20* (2013.01)

(58) Field of Classification Search
  CPC ...... B32B 2266/0278; B32B 2605/003; B62D 29/002; B62D 25/20; B62D 25/2072; B29K 2075/00; B29K 2705/00; B29L 2031/3005; B60R 13/02
  USPC ........................................................ 264/466
  See application file for complete search history.

(56) References Cited

U.S. PATENT DOCUMENTS

| | | | |
|---|---|---|---|
| 2011/0100581 A1* | 5/2011 | Kishikawa | B22D 17/2069 164/137 |
| 2012/0021402 A1 | 8/2012 | Mizrahl et al. | |
| 2012/0214018 A1* | 8/2012 | Mizrahi | B32B 5/16 428/600 |

FOREIGN PATENT DOCUMENTS

| | | | |
|---|---|---|---|
| JP | 2009-90522 A | | 4/2009 |
| JP | 2009090522 A | * | 4/2009 |
| JP | 2014-511291 A | | 5/2014 |

OTHER PUBLICATIONS

International Search Report issued in corresponding International Patent Application No. PCT/JP2017/028185 dated Oct. 17, 2017.

* cited by examiner (A)

(B)

(C)

(A)

(B)

VEHICLE INTERIOR BOARD AND METHOD FOR MANUFACTURING SAME

CROSS REFERENCE TO RELATED APPLICATIONS

This is a U.S. national phase application under 35 U.S.C. § 371 of International Patent Application No. PCT/JP2017/028185, filed Aug. 3, 2017. The entire contents of this application is hereby incorporated by reference.

TECHNICAL FIELD

The present invention relates to a vehicle interior board having a laminated structure including a pair of metal plates and a foamed polyurethane layer formed therebetween, and a method for manufacturing the same.

BACKGROUND

Typically, as the vehicle interior board, a floor board for automobiles including a pair of thin steel plates and a rigid foamed polyurethane layer sandwiched therebetween is known (for example, JP-A-2002-144477). This type of vehicle interior board is formed by reaction injection molding (RIM) including reacting foamable raw materials injected between a pair of steel plates set in a mold.

Specifically, a molding apparatus for manufacturing this type of vehicle interior board includes a lower mold and an upper mold for sandwiching the pair of steel plates. On an upper surface of the lower mold and a lower surface of the upper mold, shallow recesses having a planar shape conforming to the steel plate constituting the vehicle interior board is formed. Bottom surfaces of these recesses are setting surfaces for setting the steel plate. Then, the steel plates are respectively set on the setting surfaces of the lower mold and the upper mold. The upper mold is placed on the upper surface of the lower mold in this state. In this way, a molding space is formed between the pair of steel plates sandwiched between the upper mold and the lower mold. Note that the steel plate set in the upper mold is held by an electromagnetic force of an electromagnet or a vacuum action of a vacuum suction section provided in the upper mold.

Then, the liquid foamable raw materials containing polyol and isocyanate are supplied to the molding space formed between the pair of steel plates. Thereafter, the foamable raw materials are heated to a predetermined temperature. This causes a chemical reaction. At this time, foaming also occurs. Then, the rigid foamed polyurethane layer having a planar shape conforming to the planar shape of the steel plate is formed between the pair of steel plates. As a result, a thin, lightweight, high strength vehicle interior board including integrated the pair of steel plates and the rigid foamed polyurethane layer sandwiched therebetween is formed.

However, there have been points to be improved for the above-described vehicle interior board of the related art in order to further reduce weight for improving fuel economy of automobiles and the like, to improve reliability and durability by suppressing deterioration, peeling and the like of the metal plate, and further to improve productivity.

Specifically, in order to reduce the weight of the vehicle interior board, for example, it is conceivable to make the vehicle interior board thinner, or to adopt an aluminum plate instead of the steel plate. However, in that case, strength and rigidity of the vehicle interior board may be reduced. A load is applied to the vehicle interior board used for the floor board or the like of the vehicle in a direction substantially perpendicular to a main surface thereof by an occupant, a cargo or the like in a state where the board is mounted on the vehicle. Then, a bending moment due to the load acts on the board. Therefore, when the strength and rigidity of the vehicle interior board are insufficient, there has been a possibility that the vehicle interior board is bent largely and broken.

Furthermore, in the above-described related art, the recesses formed in the lower mold and the upper mold, and the setting surface as the bottom surface thereof have a planar shape conforming to the planar shape of the steel plate. That is, the planar shape of the rigid foamed polyurethane layer after molding is also the same as the planar shape of the steel plate. Therefore, an end portion which is a cutting surface of the steel plate was exposed at a peripheral end portion of the vehicle interior board. That is, a main surface of the steel plate is subjected to surface treatment such as galvanizing or coating, whereas the cutting surface not subjected to the surface treatment of the steel plate is exposed at the peripheral end portion of the vehicle interior board. As a result, the end portion of the steel plate may be deteriorated by oxidation or the like.

There has also been a problem that peeling of the steel plate and chipping of the rigid foamed polyurethane layer tend to easily occur at a peripheral edge portion of the vehicle interior board. That is, peeling of the steel plate tends to occur starting from near a boundary between the steel plate exposed at the end portion of the vehicle interior board and the rigid foamed polyurethane layer. Therefore, as the steel plate peels off, the rigid foamed polyurethane layer is easily chipped. Further, when removing the vehicle interior board after molding from the recess of the lower mold or the upper mold, it is difficult to demold a vicinity of the end portion of the steel plate. Specifically, the end portion of the exposed steel plate is easily caught by the lower mold or the like. Therefore, there has been a possibility that the vicinity of the end portion of the steel plate is peeled off.

The present invention has been made in view of the above circumstances. An object of the present invention is to provide a vehicle interior board which is thin, lightweight, has high strength, has less deterioration and peeling in the vicinity of the end portion of the metal plate, is high in quality and is excellent in productivity, and a method for manufacturing the same.

SUMMARY

A vehicle interior board according to the present invention includes a pair of metal plates; and a foamed polyurethane layer formed between the pair of metal plates, wherein a projecting ridge projecting outwardly and extending in a predetermined direction along the outer surface is formed on an outer surface of the metal plate.

A method for manufacturing a vehicle interior board according to the present invention includes a step of molding a pair of flat metal plates respectively into predetermined planar shapes; a step of coating main surfaces respectively corresponding to inner surfaces of the pair of metal plates with an epoxy resin-based coating agent; a step of forming a molding space between the pair of metal plates by sandwiching the pair of metal plates between a lower mold and an upper mold so that the main surfaces corresponding to the inner surfaces coated with the coating agent face each other; and a step of forming a foamed polyurethane layer by reacting raw materials of foamed polyurethane injected into the molding space, wherein a setting surface for setting the metal plate so that the outer surface of the metal plate abuts each of the lower mold and the upper mold is formed in each of the lower mold and the upper mold, a recessed groove extending in a predetermined direction is formed on the setting surface of at least one of the lower mold and the upper mold, and in the step of forming the foamed polyurethane layer, the flat metal plate is deformed by being pressed by a pressure of the foamed polyurethane to form a projecting ridge by projecting from the outer surface so as to have a shape corresponding to the recessed groove.

The vehicle interior board of the present invention includes the pair of metal plates and the foamed polyurethane layer formed between the pair of metal plates. On the outer surface of the metal plate, the projecting ridge projecting outwardly and extending in the predetermined direction along the outer surface is formed. Since the projecting ridge is formed, the strength and rigidity of the vehicle interior board can be increased. Thus, it is possible to obtain desired strength and rigidity even when the metal plates or the foamed polyurethane layer are thinned or when a lightweight aluminum plate or the like is adopted as the metal plates. Therefore, it is possible to reduce the weight of the vehicle interior board.

Further, according to the vehicle interior board of the present invention, the peripheral end portion of the metal plate may be covered with the foamed polyurethane layer. This makes it possible to suppress oxidation of the peripheral end portion which is the cutting surface of the metal plate.

Further, since the peripheral end portion of the metal plate is covered with the foamed polyurethane layer, the bonding between the metal plate and the foamed polyurethane layer is good at the peripheral edge portion of the metal plate. Thus, peeling of the metal plate can be prevented.

Further, the peripheral edge portion of the vehicle interior board may be surrounded by the foamed polyurethane layer formed flush with the outer surface of the metal plate. Since the peripheral edge portion of the vehicle interior board is formed of the foamed polyurethane layer, it possible to round a peripheral corner portion of the vehicle interior board. This makes it possible to prevent peeling of the metal plate, chipping of the foamed polyurethane layer, and the like when the vehicle interior board is removed from the mold in a process for manufacturing the vehicle interior board. Therefore, it is easy to demold the vehicle interior board.

The method for manufacturing the vehicle interior board according to the present invention includes: the step of molding the pair of flat metal plates respectively into predetermined planar shapes; the step of coating the main surfaces respectively corresponding to the inner surfaces of the pair of metal plates with the epoxy resin-based coating agent; the step of forming the molding space between the pair of metal plates by sandwiching the pair of metal plates between the lower mold and the upper mold so that the main surfaces corresponding to the inner surfaces coated with the coating agent face each other; and the step of forming the foamed polyurethane layer by reacting the raw materials of the foamed polyurethane injected into the molding space. The setting surface for setting the metal plate is formed in each of the lower mold and the upper mold. The metal plate is set on the setting surface so that the outer surface of the metal plate abuts each of the lower mold and the upper mold. The recessed groove extending in the predetermined direction is formed on the setting surface of at least one of the lower mold and the upper mold. In the step of forming the foamed polyurethane layer, the substantially flat metal plate is deformed by being pressed by the pressure of the foamed polyurethane to form the projecting ridge projecting from the outer surface in the shape corresponding to the recessed groove. Thus, it is possible to obtain the vehicle interior board having the projecting ridge on the outer surface and having high strength and rigidity. Further, it is not necessary to form a projecting shape corresponding to the projecting ridge on the metal plate as a material. Therefore, there is no need for the mold and the step to form the projecting ridge on the metal plate. As a result, the productivity of the vehicle interior board can be improved.

According to the method for manufacturing the vehicle interior board of the present invention, the setting surface of the lower mold and the upper mold are formed to have the planar shape larger than that of the metal plate. The pair of metal plates may be arranged near a center of the setting surface. Thus, at the peripheral edge portion of the vehicle interior board, the foamed polyurethane layer is formed to cover the peripheral end portion of the metal plate and flush with the outer surface of the metal plate. This makes it possible to suppress oxidation of the peripheral end portion of the metal plate. Further, the peripheral end portion of the metal plate is bonded to the foamed polyurethane layer. Thus, bonding strength between the metal plate and the foamed polyurethane layer is increased. Therefore, peeling of the metal plate can be prevented.

Further, the peripheral edge portion of the vehicle interior board is formed of the foamed polyurethane layer. This makes it possible to round the peripheral corner portion of the vehicle interior board. This makes it possible to prevent peeling of the metal plate, chipping of the foamed polyurethane layer, or the like. Furthermore, it is possible to facilitate demolding of the vehicle interior board.

BRIEF DESCRIPTION OF THE DRAWINGS

FIG. 3A is a view showing a state where a pair of metal plates is set in the lower mold and the upper mold.

FIG. 3B is a view showing a state where a molding space is formed. FIG. 3C is a view showing a state where a foamed polyurethane layer is formed.

DETAILED DESCRIPTION

Figure 1:
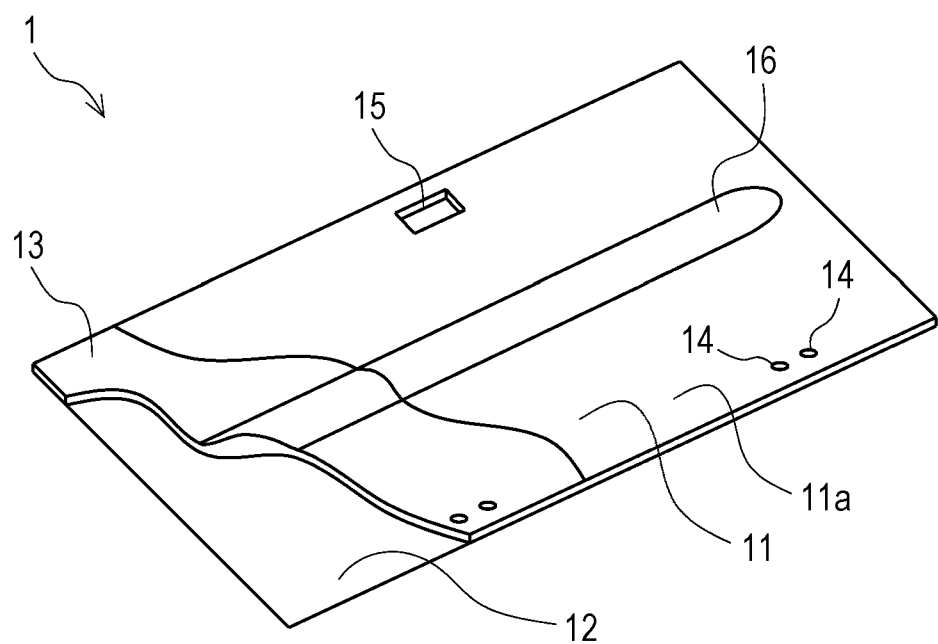
FIG. 1 is a perspective view showing a vehicle interior board according to an embodiment of the present invention.
Figure 2:
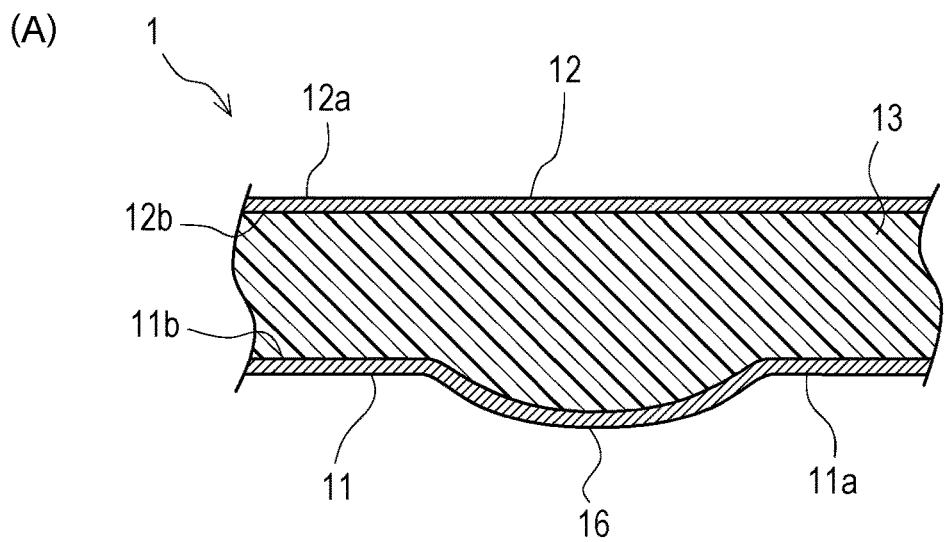
FIG. 2A is a cross-sectional view showing a vicinity of a projecting ridge of the vehicle interior board according to the embodiment of the present invention.
FIG. 2B is a cross-sectional view showing a peripheral edge portion of the vehicle interior board according to the embodiment of the present invention.
FIG. 2C is a cross-sectional view showing another example of the peripheral edge portion of the vehicle interior board according to the embodiment of the present invention.
Figure 2:
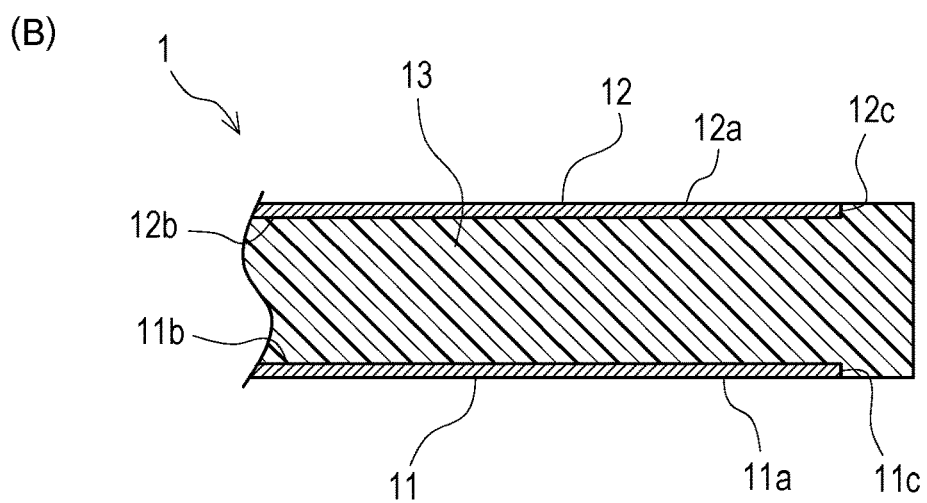
Figure 2:
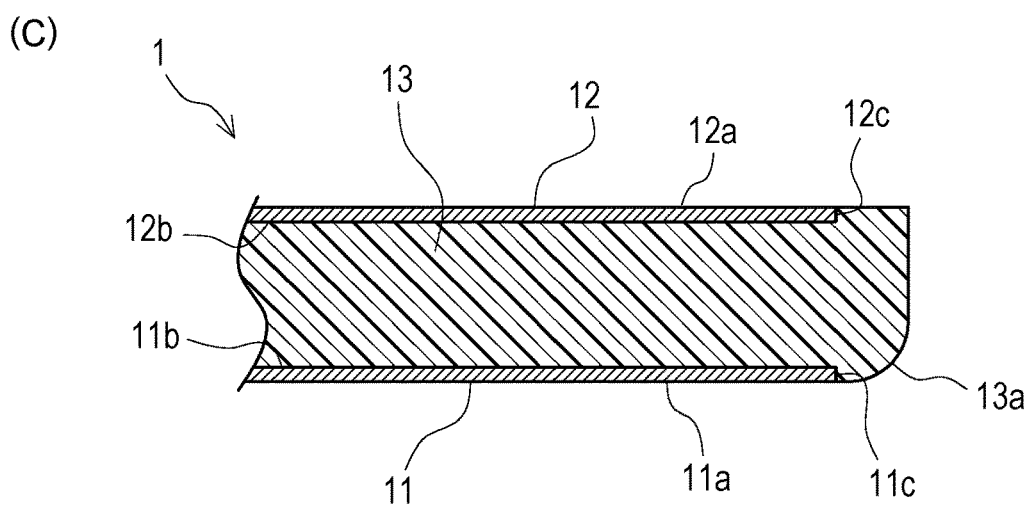

Hereinafter, a vehicle interior board and a method for manufacturing the same according to an embodiment of the present invention will be described in detail with reference to the drawings. First, with reference to FIGS. 1 and 2, a structure of a vehicle interior board 1 according to the embodiment of the present invention will be described in detail. FIG. 1 is a perspective view showing a schematic structure of the vehicle interior board 1. The vehicle interior board 1 is used, for example, as a floor board or the like of a cargo room of a vehicle such as an automobile.

As shown in FIG. 1, the vehicle interior board 1 includes a pair of metal plates 11, 12 and a foamed polyurethane layer 13 formed between the metal plate 11 and the metal plate 12. The vehicle interior board 1 is a plate-like body having a multilayer structure integrally molded by a manufacturing method described later. Thickness of the vehicle interior board 1 is, for example, about 3 to 20 mm. The vehicle interior board 1 is molded into a predetermined peripheral shape depending on an application.

The pair of metal plates 11, 12 is a substantially flat aluminum plate having a thickness of, for example, about 0.1 to 0.3 mm, preferably about 0.12 to 0.15 mm. For the sake of explanation, the thicknesses of the metal plates 11 and 12 are enlarged in the figures. Since aluminum plates are used as the metal plates 11 and 12, the vehicle interior board 1 which is lightweight and has high strength can be obtained. As the metal plates 11 and 12, other metal plates such as a galvanized steel plate or various coated steel plates may be used. When the steel plates are used as the metal plates 11 and 12, the metal plates 11 and 12 preferably have a thickness of about 0.07 to 0.3 mm.

The metal plate 11 is provided on a surface on a vehicle outer side in a state where the vehicle interior board 1 is mounted on the vehicle. On the other hand, the metal plate 12 is provided on a surface on a vehicle compai linent inner side in the state where the vehicle interior board 1 is mounted on the vehicle. Specifically, when the vehicle interior board 1 is used as the floor board of the vehicle, the metal plate 11 provided at a lower portion of the vehicle interior board 1 faces to the vehicle outer side below. At this time, the metal plate 12 provided at an upper portion of the vehicle interior board 1 faces to the vehicle compartment inner side above.

A linear or strip-shaped projecting ridge 16 projecting outwardly and extending in a predetermined direction along an outer surface 11a of the metal plate 11 is formed on the metal plate 11. Specifically, the projecting ridge 16 projects from the outer surface 11a of the metal plate 11 in a substantially arcuate cross-sectional shape and extends in a substantially linear shape elongated in one direction along the outer surface 11a. Since the projecting ridge 16 is formed in this way, strength and rigidity of the vehicle interior board 1 can be ensured.

The projecting ridge 16 is formed on the metal plate 11 on the vehicle outer side and is formed to project to the vehicle outer side. Therefore, the projecting ridge 16 does not project to the vehicle compartment inner side to narrow a space of the vehicle compartment. Even when a load or the like is placed on the vehicle interior board 1, the projecting ridge 16 is not an obstacle.

Further, corner portions of both end portions in a longitudinal direction of the projecting ridge 16 are rounded.

Further, both end portions in the longitudinal direction of the projecting ridge 16 are formed in a substantially semicircular shape in a plan view. Thus, it is easy to form the projecting ridge 16 by plastic deformation of the metal plate 11. In addition, it is possible to suppress stress concentration near the end portions in the longitudinal direction of the projecting ridge 16.

Further, the projecting ridge 16 extends in a left-right direction or a front-rear direction of the vehicle in the state where the vehicle interior board 1 is mounted on the vehicle. The projecting ridge 16 extends in a direction in which a distance between fulcrums supporting the vehicle interior board 1 is longer. Thus, the rigidity of the vehicle interior board 1 is increased. As a result, it is possible to efficiently suppress deflection of the vehicle interior board 1 due to loads such as an occupant or a cargo. Further, the strength of the vehicle interior board 1 is increased. Furthermore, breakage of the vehicle interior board 1 can be prevented.

A shape of the projecting ridge 16, a position in which the projecting ridge 16 is formed, and the number of ridges of the projecting ridge 16 is not limited to an example shown in FIG. 1. The shape, the position, and the number are appropriately set depending on a form of the vehicle on which the vehicle interior board 1 is provided, the position in which the vehicle interior board 1 is provided, and the like. For example, the projecting ridge 16 may be formed to extend in a substantially curved shape. Or for example, the projecting ridge 16 may be formed in a plurality of ridges. Specifically, two or three projecting ridges 16 extending substantially in parallel may be formed. Or for example, the projecting ridge 16 may be formed on the metal plate 12 on the vehicle compartment inner side and project to the vehicle compartment inner side. Specifically, the projecting ridge 16 may be formed only on one of the metal plate 11 on the vehicle outer side and the metal plate 12 on the vehicle compartment inner side. Or, the projecting ridge 16 may be formed on both the metal plate 11 and the metal plate 12, and may project to both surface sides of the vehicle outer side and the vehicle compartment inner side.

The vehicle interior board 1 is formed with mounting holes 14, a handle hole 15, other mounting holes (not shown), and the like for mounting other components (not shown) such as a hinge, a screw, a rivet, or a handle.

The mounting holes 14 and the handle hole 15 are formed, for example, as holes which penetrate from one main surface of the vehicle interior board 1 to the other main surface on an opposite side thereof. The mounting holes 14 and the handle hole 15 may be holes which do not penetrate from the one main surface of the vehicle interior board 1 to the other main surface.

Further, a grommet or the like as a reinforcing member or a fastening member may be disposed around the mounting hole 14. The reinforcing member made of a steel wire or the like may be disposed in the foamed polyurethane layer 13 around the handle hole 15 so as to surround the handle hole 15. Thus, the strength and rigidity near the handle hole 15 are increased.

Although not shown, a carpet or the like is attached to outer surfaces 11a, 12a (see FIGS. 2A to 2C) of the vehicle interior board 1 as a skin material for surface finishing depending on the application. As examples of the skin material, a nonwoven fabric made of polyethylene terephthalate (PET) and the like are used. As the skin material, a nonwoven fabric or a textile fabric made of other fibers or the like may be used. Or, other various sheet materials or the like may be used.

FIG. 2A is a cross-sectional view showing a schematic structure near the projecting ridge 16 of the vehicle interior board 1. FIG. 2A shows a cross-section with respect to an extending direction of the projecting ridge 16. As shown in FIG. 2A, the projecting ridge 16 bulges outward in the substantially arcuate cross-sectional shape. That is, the projecting ridge 16 is formed thicker than other portions of the vehicle interior board 1. Since the projecting ridge 16 is form, a section modulus of the vehicle interior board 1 is increased. As a result, the strength and flexural rigidity of the vehicle interior board 1 are increased.

A continuous portion between the projecting ridge 16 having the substantially arcuate cross-sectional shape formed on the metal plate 11 and the substantially flat outer surface 11a of the metal plate 11 is moderately rounded. The projecting ridge 16 is formed in the substantially arcuate cross-sectional shape in this manner. Further, the continuous portion of the projecting ridge 16 and the outer surface 11a is moderately rounded. Thus, the projecting ridge 16 can be easily formed by plastic deformation of the metal plate 11. At the same time, stress concentration near the projecting ridge 16 is suppressed.

FIG. 2B is a cross-sectional view showing a schematic structure of a peripheral edge portion of the vehicle interior board 1. As shown in FIG. 2B, the foamed polyurethane layer 13 has a larger planar shape than that of the metal plates 11 and 12. The foamed polyurethane layer 13 protrudes outwardly from peripheral end portions 11c, 12c of the metal plates 11, 12 at the peripheral edge portion of the vehicle interior board 1.

The peripheral end portions 11c, 12c of the metal plates 11, 12 are covered with the foamed polyurethane layer 13. That is, the foamed polyurethane layer 13 has a portion formed outside the peripheral end portions 11c, 12c of the metal plates 11, 12. The foamed polyurethane layer 13 is formed so that an upper surface and a lower surface of the portion are respectively flush with outer surfaces 11a, 12a of the metal plates 11, 12.

In this way, the peripheral end portions 11c, 12c of the metal plates 11, 12 are covered with the foamed polyurethane layer 13. Thus, it is possible to suppress deterioration due to oxidation or the like of the peripheral end portions 11c, 12c which are cutting surfaces of the metal plates 11, 12. Further, the metal plates 11, 12 have good bonding with the foamed polyurethane layer 13 at the peripheral end portions 11c, 12c. Therefore, peeling of the metal plates 11 and 12 can be prevented.

FIG. 2C is a cross-sectional view showing another example of the peripheral edge portion of the vehicle interior board 1. As described above, the peripheral edge portion of the vehicle interior board 1 is surrounded by the foamed polyurethane layer 13. With such a structure, as shown in FIG. 2C, a peripheral corner portion of the vehicle interior board 1 is rounded. Thus, a chamfered portion 13a can be formed.

Since the chamfered portion 13a is formed, it is possible to prevent peeling of the metal plates 11 and 12, chipping of the foamed polyurethane layer 13, and the like when the vehicle interior board 1 is removed from the mold in a process for manufacturing the vehicle interior board 1. Thus, it is easy to demold the vehicle interior board 1. Note that a shape of the chamfered portion 13a is not limited to a rounded shape. It may be a chamfered shape of attaching a flat surface to the peripheral corner portion. Further, chamfered portions 13a may be formed at corner portions on upper and lower surface sides of the vehicle interior board 1. Further, as shown in FIG. 2B, it is of course also possible to configure so that the chamfered portions 13a is not formed.

Figure 3:
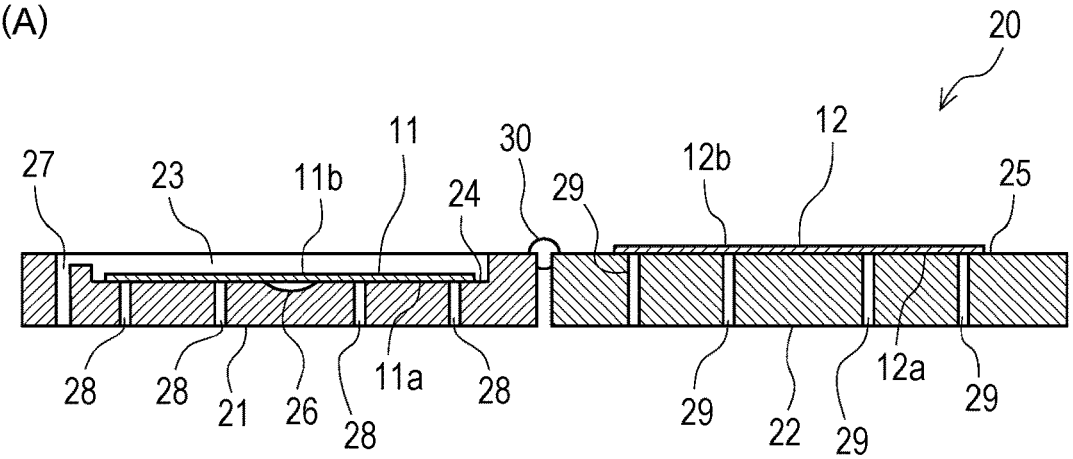
FIGS. 3A to 3C are diagrams showing a process for manufacturing the vehicle interior board according to the embodiment of the present invention.
Figure 3:
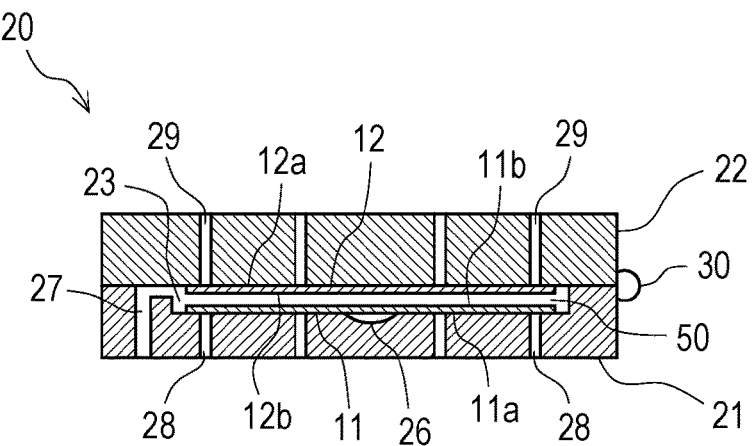
Figure 3:
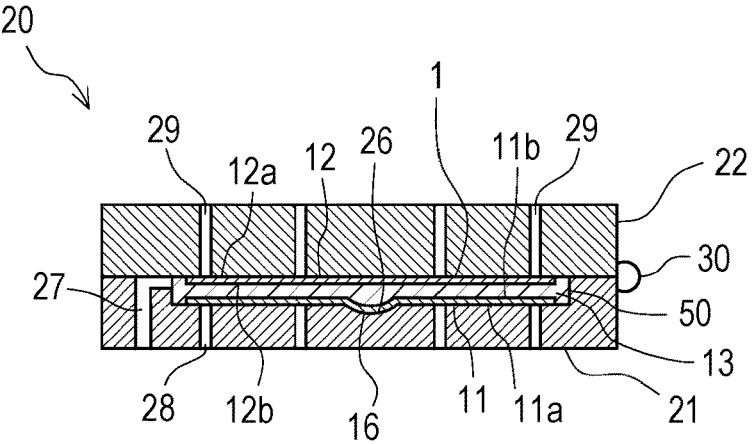
Figure 4:
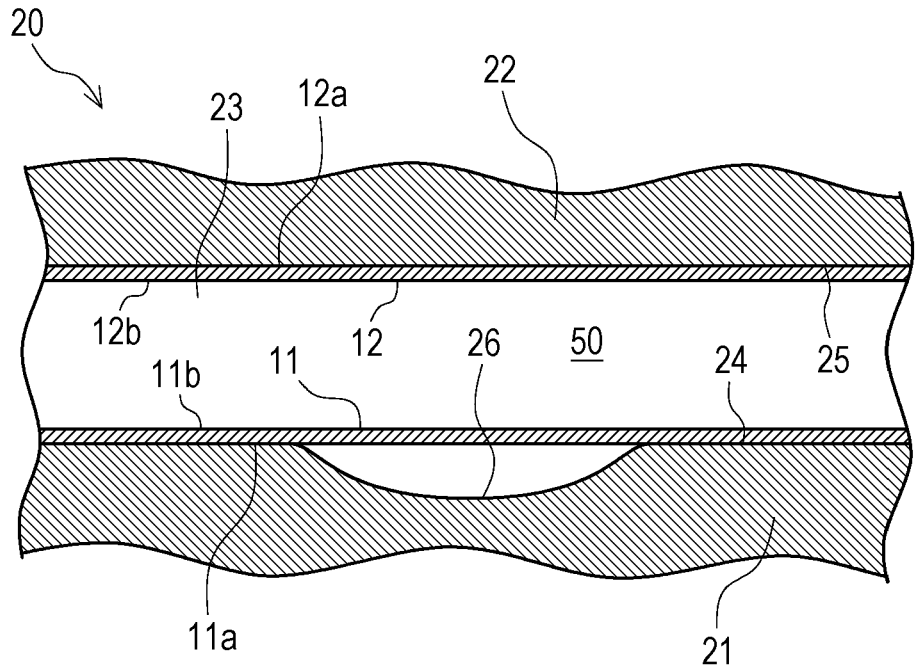
FIG. 4A is a cross-sectional view of a vicinity of a recessed groove of the lower mold in the state where the molding space is formed in the process for manufacturing the vehicle interior board according to the embodiment of the present invention.
FIG. 4B is a cross-sectional view of the vicinity of the recessed groove of the lower mold in the state where the foamed polyurethane layer is formed.
Figure 4:
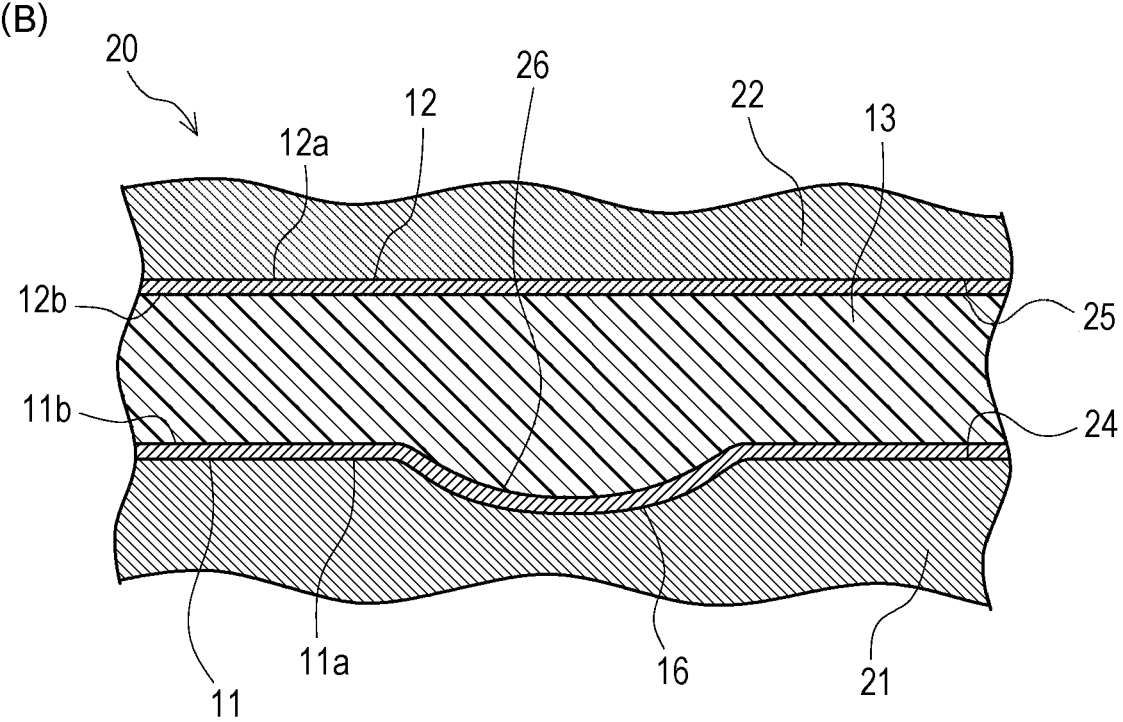
Figure 5:
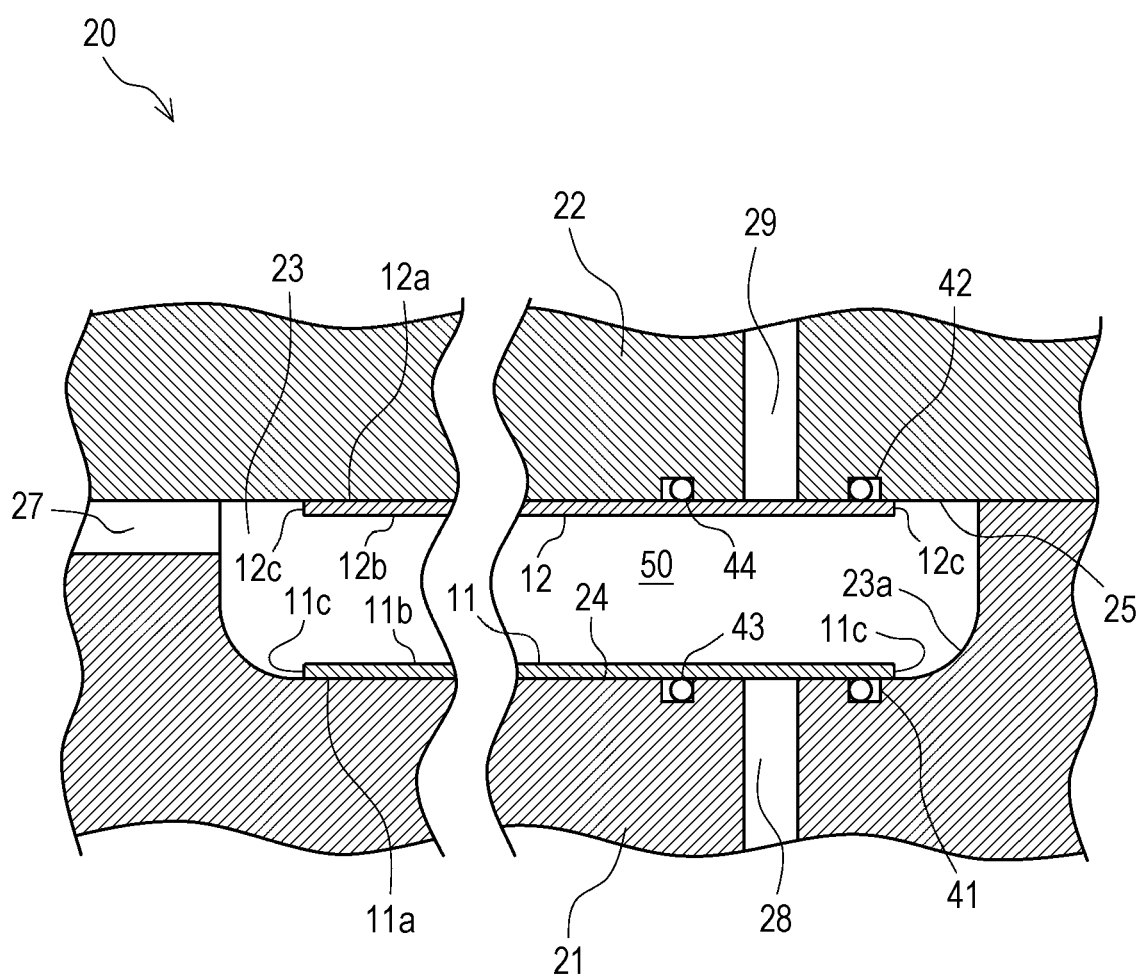
FIG. 5A is a cross-sectional view showing a vicinity of peripheral end portions of the metal plates set in the lower mold and the upper mold in the process for manufacturing the vehicle interior board according to the embodiment of the present invention.
FIG. 5B is a plan view showing a vicinity of a vacuum hole of the lower mold.
Figure 5:
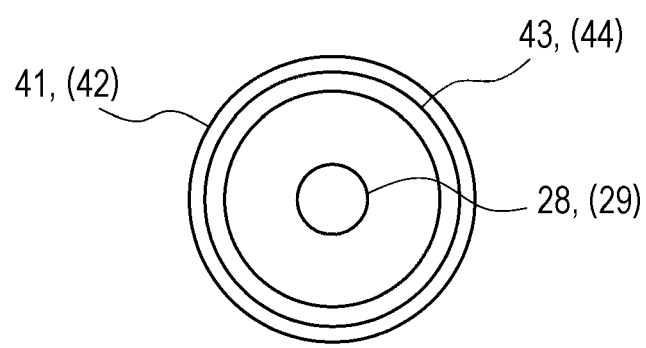

Next, referring to FIGS. 3A to 5B, a molding apparatus 20 for molding the vehicle interior board 1 and a method for manufacturing the vehicle interior board 1 will be described in detail. FIGS. 3A to 3C are diagrams showing the process for manufacturing the vehicle interior board 1. FIG. 3A is a view showing a state where a pair of metal plates 11, 12 is set in a lower mold 21 and an upper mold 22. FIG. 3B is a view showing a state where a molding space 50 is formed. FIG. 3C is a view showing a state where the foamed polyurethane layer 13 is formed.

First, as the process for manufacturing the vehicle interior board 1, a step of molding the metal plates 11, 12 is performed. Specifically, for example, the pair of metal plates 11 and 12 is respectively cut into predetermined peripheral shapes, for example, by press shearing processing, laser processing or the like. Further, holes for forming the mounting holes 14 and the handle hole 15 shown in FIG. 1, positioning holes and the like are formed in the metal plates 11 and 12.

Next, a step of applying a coating agent is performed. In the step of applying the coating agent, one main surface of each of the pair of metal plates 11, 12 is coated with an epoxy resin-based coating agent. The one main surface coated with the coating agent is a main surface corresponding to inner surfaces 11b, 12b. The inner surfaces 11b, 12b face the foamed polyurethane layer 13 side when the vehicle interior board 1 is formed. Then, a drying step of drying the applied coating agent is performed. Thus, the coating agent is dried.

Next, as shown in FIG. 3A and FIG. 3B, a step of forming the molding space 50 is performed. In the step of forming the molding space 50, as shown in FIG. 3A, the metal plates 11, 12 coated with the coating agent are first set in the lower mold 21 and the upper mold 22 of the molding apparatus 20 which is a RIM molding apparatus.

Here, the molding apparatus 20 has the lower mold 21 and the upper mold 22 connected to the lower mold 21 so as to be freely opened and closed via a hinge portion 30. A recess 23 having a larger planar shape than that of the metal plate 11 is formed on an upper surface of the lower mold 21 of the molding apparatus 20. A bottom surface of the recess 23 corresponds to a setting surface 24 on which the metal plate 11 is set. The metal plate 11 is set on the setting surface 24 so that a main surface corresponding to the outer surface 11a of the metal plate 11, that is, the main surface opposite to the inner surface 11b coated with the coating agent abuts a substantial center of the setting surface 24.

A setting surface 25 having a larger planar shape than that of the metal plate 12 is formed in the upper mold 22. The metal plate 12 is set on the setting surface 25 so that a main surface corresponding to the outer surface 12a of the metal plate 12, that is, the main surface opposite to the inner surface 12b coated with the coating agent abuts a substantial center of the setting surface 25.

Further, positioning pins (not shown) are formed on the setting surface 24 and the setting surface 25 for fixing the metal plates 11, 12 respectively to the substantial centers of the setting surface 24 and the setting surface 25. Then, the metal plate 11 is set so that the positioning holes formed in the metal plate 11 are fitted to the positioning pins formed on the setting surface 24. Similarly, the metal plate 12 is set so that the positioning holes formed in the metal plate 12 are fitted to the positioning pins formed on the setting surface 25. This makes it possible to fix the metal plates 11, 12 to the substantial centers of the setting surfaces 24, 25.

Then, an inside of a vacuum hole 28 opening to the setting surface 24 of the lower mold 21 and an inside of a vacuum hole 29 opening to the setting surface 25 of the upper mold 22 are depressurized by a vacuum apparatus (not shown). Thus, the metal plates 11 and 12 are sucked by the vacuum holes 28, 29 and are respectively held in the lower mold 21 and the upper mold 22. When magnetic materials, for example, such as steel plates are used as the metal plates 11 and 12, the metal plates 11 and 12 may be held by utilizing a magnetic force of an electromagnet.

Next, as shown in FIG. 3B, the upper mold is closed and placed on the upper surface of the lower mold. Thus, the pair of metal plates 11, 12 is sandwiched between the lower mold 21 and the upper mold 22 so that the main surfaces corresponding to the inner surfaces 11b, 12b coated with the coating agent face each other. Then, the molding space 50 is formed between the metal plate 11 and the metal plate 12.

Then, as shown in FIG. 3C, a liquid mixed material containing isocyanate and polyol as liquid raw materials of foamed polyurethane is injected into the molding space 50 via an injection port 27. Thus, a step of forming the foamed polyurethane layer 13 is performed.

Here, the lower mold 21 and the upper mold 22 are maintained at a predetermined temperature, for example, 60 to 80° C. by a heating section (not shown). Thus, the liquid raw materials injected into the molding space 50 are heated in the molding space 50. As a result, the liquid raw materials undergo a chemical reaction, and are foamed and cured. As a result, the foamed polyurethane layer 13 is formed.

In this way, the liquid raw materials react and are foamed and cured to form the foamed polyurethane layer 13. Thus, the metal plates 11, 12 are strongly bonded using the foamed polyurethane layer 13 as a bonding member. In this way, the integrated vehicle interior board 1 is molded.

As described above, the inner surfaces 11b, 12b of the metal plates 11, 12 are previously coated with the epoxy resin-based coating agent. Thus, the bonding between the foamed polyurethane layer 13 and the metal plates 11, 12 is strengthened.

After molding of the foamed polyurethane layer 13 is completed, holding of the metal plates 11, 12 by the vacuum holes 28, 29 is released. Then, the upper mold 22 is opened, and the vehicle interior board 1 is removed from the lower mold 21.

Through the above steps, the vehicle interior board 1 having a laminated structure in which the pair of metal plates 11, 12 and the foamed polyurethane layer 13 are integrated is completed. Thereafter, an appropriate skin material or the like is attached to the outer surfaces 11a, 12a of the vehicle interior board 1 depending on each application. Further, other components and the like are mounted on the vehicle interior board 1. In this way, products such as floor boards used for vehicles and the like are completed.

As described above, by positioning the metal plates 11, 12 with the positioning pins, in a step of forming the foamed polyurethane layer, the holes having shapes corresponding to shapes of the positioning pins or through-holes penetrating vertically are formed at positions corresponding to the positioning pins of the vehicle interior board 1. The holes and the through-holes can be used as the mounting holes 14 and the handle hole 15 for mounting other components on the vehicle interior board 1 shown in FIG. 1.

That is, in a step of molding the vehicle interior board 1, it is possible to simultaneously form the mounting holes 14 and the handle hole 15 for mounting other components on the vehicle interior board 1 using the positioning pins. Thus, it is not necessary to separately perform a step of forming the mounting holes 14 and the handle hole 15 after molding the vehicle interior board 1. Therefore, productivity of the vehicle interior board 1 is improved.

FIG. 4A is a cross-sectional view of a vicinity of a recessed groove 26, showing a state where the molding space 50 is formed in the process for manufacturing the vehicle interior board 1. FIG. 4B is a cross-sectional view of the vicinity of the recessed groove 26, showing a state where the foamed polyurethane layer 13 is formed.

As shown in FIG. 4A, the recessed groove 26 recessed downward from the setting surface 24 is formed on the setting surface 24 of the lower mold 21. The recessed groove 26 is a substantially groove-shaped recess extending long in a predetermined direction and having a substantially arcuate cross-sectional shape. A continuous portion of the recessed groove 26 and the substantially flat setting surface 24 around the recessed groove 26 is moderately rounded.

The metal plate 11 as a material is substantially flat. Therefore, in a state where the metal plate 11 is set on the setting surface 24, the metal plate 11 is not in contact with the recessed groove 26. That is, a gap is formed between the metal plate 11 and the recessed groove 26.

The liquid raw materials of the foamed polyurethane injected into the molding space 50 react to be foamed and cured. Thus, as shown in FIG. 4B, the metal plate 11 is pressed by a pressure of the reacting foamed polyurethane layer 13, and is deformed substantially along the recessed groove 26. Thus, the projecting ridge 16 projecting from the substantially flat outer surface 11a is formed to have a shape corresponding to a shape of the recessed groove 26.

Further, in the step of forming the foamed polyurethane layer 13, the projecting ridge 16 is formed. Therefore, it is not necessary to previously form a projecting shape corresponding to the projecting ridge 16 on the metal plate 11 as the material. That is, it is not necessary to perform a step of forming the projecting shape corresponding to the projecting ridge 16 on the metal plate 11 before the step of forming the foamed polyurethane layer 13. Further, a metal mold for forming the projecting shape on the metal plate 11 is not necessary. Therefore, the productivity of the vehicle interior board 1 is improved.

Instead of or in addition to the structure having the recessed groove 26 formed on the setting surface 24 of the lower mold 21 as described above, although not shown, the recessed groove 26 may be formed on the setting surface 25 of the upper mold 22 so as to be recessed upward. That is, the recessed groove 26 may be formed only in one of the lower mold 21 and the upper mold 22. Or, it may be formed on both the lower mold 21 and the upper mold 22. The recessed groove 26 is formed on the setting surface 25 of the upper mold 22. Thus, in the same manner as described above, in the step of forming the foamed polyurethane layer 13, it is possible to form the projecting ridge 16 having the shape corresponding to the shape of the recessed groove 26 and projecting upward from the substantially flat outer surface 12a of the metal plate 12.

FIG. 5A is a cross-sectional view showing a vicinity of peripheral end portions 11c, 12c of the metal plates 11, 12 in the state where the molding space 50 is formed. FIG. 5B is a plan view showing a vicinity of the vacuum hole 28 of the lower mold 21.

As described above, the setting surfaces 24, 25 of the lower mold 21 and the upper mold 22 are formed to have a larger planar shape than that of the metal plates 11, 12. In the step of forming the molding space 50, the metal plates 11, 12 are respectively arranged near the center of the setting surfaces 24, 25. That is, in the state where the molding space 50 is formed, the peripheral end portions 11c and 12c do not abut the lower mold 21 and the upper mold 22 but are exposed in the molding space 50.

Thus, in the step of forming the foamed polyurethane layer 13 (see FIGS. 2A to 2C) with the liquid raw materials injected into the molding space 50, the foamed polyurethane layer 13 is formed to cover the peripheral end portions 11c, 12c of the metal plates 11, 12 and flush with the outer surfaces 11a, 12a of the metal plates 11, 12. Thus, it is possible to suppress oxidation of the peripheral end portions 11c, 12c of the metal plates 11, 12. In addition, bonding strength between the metal plates 11, 12 and the foamed polyurethane layer 13 is increased. As a result, peeling or the like of the metal plates 11, 12 can be prevented.

A peripheral corner portion 23a of the recess 23 of the lower mold 21 may be rounded. Thus, as shown in FIG. 2C, the chamfered portion 13a can be formed at the peripheral corner portion of the vehicle interior board 1. As a result, it is possible to prevent peeling of the metal plates 11, 12, chipping of the foamed polyurethane layer 13, or the like. In addition, it is possible to facilitate demolding of the vehicle interior board 1.

As shown in FIGS. 5A and 5B, the vacuum holes 28, 29 opening to the setting surfaces 24, 25 are respectively formed in the setting surfaces 24, 25 of the lower mold 21 and the upper mold 22. Substantially annular sealing ring grooves 41, 42 surrounding the vacuum holes 28, 29 are formed around the vacuum holes 28, 29. Sealing rings 43, 44 as sealing members are mounted in the sealing ring grooves 41, 42. The vacuum holes 28, 29 and the sealing rings 43, 44 surrounding them are formed in plurality at positions corresponding to the planar shapes of the metal plates 11, 12.

The sealing rings 43, 44 may be so-called O-rings or the like which is formed in a substantially annular shape and having a substantially circular cross-sectional shape of an element wire. Further, as the sealing rings 43, 44, in addition to the O-ring, various modified cross-sectional sealing rings formed so as to have a cross-sectional shape of the elemental wire such as a substantially quadrangular shape, a substantially T shape, a substantially cross shape, a substantially U shape, or the like may be used.

With such a structure, in a step of setting the metal plates 11, 12, the insides of the vacuum holes 28, 29 are depressurized. Thus, the metal plates 11, 12 are sucked in a region surrounded by the sealing rings 43, 44. In this way, the metal plates 11, 12 are held in the lower mold 21 or the upper mold 22.

Thus, the metal plates 11, 12 are in close contact with the lower mold 21 or the upper mold 22. Thus, the metal plates 11, 12 can be held in predetermined positions. Therefore, it is possible to suppress the foamed polyurethane from leaking and adhering to the outer surfaces 11a, 12a of the metal plates 11, 12. As a result, it is possible to manufacture a high-quality vehicle interior board 1.

Further, suction by the vacuum holes 28, 29 surrounded by the sealing rings 43, 44 is utilized. Thus, the metal plates 11 and 12 made of a non-magnetic material such as aluminum can be suitably held. Therefore, it is possible to form the vehicle interior board 1 which is lightweight and high in strength. Further, the sealing rings 43, 44 are provided around the vacuum holes 28, 29. This makes it possible to suppress clogging or the like of the vacuum holes 28, 29 caused by the foamed polyurethane.

The present invention is not limited to the above embodiments. Various other modifications can be made without departing from the gist of the present invention.

The invention claimed is:

1. A method for manufacturing a vehicle interior board, comprising:

a step of molding a pair of flat metal plates respectively into predetermined planar shapes;

a step of coating main surfaces of the pair of metal plates respectively corresponding to inner surfaces of the pair of metal plates with an epoxy resin-based coating agent;

a step of forming a molding space between the pair of metal plates by sandwiching the pair of metal plates between a lower mold and an upper mold so that the main surfaces corresponding to the inner surfaces coated with the coating agent face each other;

a step of forming a foamed polyurethane layer by reacting raw materials of foamed polyurethane injected into the molding space;

a step of forming a setting surface in each of the lower mold and the upper mold for setting each of the metal plates, so that the outer surface of each of the metal plates abuts the lower mold and the upper mold, respectively; and a step of extending a recessed groove in a predetermined direction on the setting surface of at least one of the lower mold and the upper mold, in the step of forming the foamed polyurethane layer, at least one of the metal plates is deformed by being pressed by a pressure of the foamed polyurethane layer to form a projecting ridge projecting from the outer surface so as to have a shape corresponding to the recessed groove, wherein the foamed polyurethane layer is formed to cover peripheral end portions of each of the metal plates; and a step of depressurizing a vacuum hole in each of the lower mold and the upper mold.

2. The method for manufacturing the vehicle interior board according to claim 1, wherein the setting surfaces of the lower mold and the upper mold are formed to have a planar shape larger than the shapes of each of the metal plates, and each of the pair of metal plates is disposed near a center of one of the setting surfaces.

3. The method for manufacturing the vehicle interior board according to claim 1, further comprising a step of attaching a skin material to the outer surface of each of the metal plates.

* * * * *